US012305252B2

(12) United States Patent
Takatani et al.

(10) Patent No.: US 12,305,252 B2
(45) Date of Patent: May 20, 2025

(54) GRAIN-ORIENTED ELECTRICAL STEEL SHEET

(71) Applicant: NIPPON STEEL CORPORATION, Tokyo (JP)

(72) Inventors: Shinsuke Takatani, Tokyo (JP); Masaru Takahashi, Tokyo (JP); Kazumi Mizukami, Tokyo (JP); Shunsuke Okumura, Tokyo (JP); Shohji Nagano, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 16/629,531

(22) PCT Filed: Jul. 13, 2018

(86) PCT No.: PCT/JP2018/026615
§ 371 (c)(1),
(2) Date: Jan. 8, 2020

(87) PCT Pub. No.: WO2019/013348
PCT Pub. Date: Jan. 17, 2019

(65) Prior Publication Data
US 2020/0123632 A1 Apr. 23, 2020

(30) Foreign Application Priority Data
Jul. 13, 2017 (JP) ................................ 2017-137417

(51) Int. Cl.
*C21D 9/46* (2006.01)
*C21D 3/04* (2006.01)
(Continued)

(52) U.S. Cl.
CPC ................ *C21D 9/46* (2013.01); *C21D 3/04* (2013.01); *C21D 6/001* (2013.01); *C21D 6/005* (2013.01);
(Continued)

(58) Field of Classification Search
None
See application file for complete search history.

(56) References Cited

U.S. PATENT DOCUMENTS 3,856,568 A 12/1974 Tanaka et al.
5,961,744 A * 10/1999 Yamazaki ............ C21D 8/1288 148/113

(Continued)

FOREIGN PATENT DOCUMENTS

EP 0 565 029 A1 10/1993
JP 48-39338 A 6/1973

(Continued)

OTHER PUBLICATIONS

Russian Notice of Allowance and Search Report, dated May 15, 2020, for counterpart Russian Application No. 2020102682, with English translations.

(Continued)

*Primary Examiner* — Humera N. Sheikh
*Assistant Examiner* — Elizabeth D Ivey
(74) *Attorney, Agent, or Firm* — Birch, Stewart, Kolasch & Birch, LLP

(57) ABSTRACT

An grain-oriented electrical steel sheet according to the present invention includes: a base steel sheet; an oxide layer that is formed on the base steel sheet and is formed of amorphous $SiO_2$; and a tension-insulation coating that is formed on the oxide layer. The base steel sheet includes, as a chemical composition, by mass %, C: 0.085% or less, Si: 0.80% to 7.00%, Mn: 1.00% or less, acid-soluble Al:
(Continued)

0.065% or less, Seq represented by S+0.406·Se: 0.050% or less, and a remainder consisting of Fe and unavoidable impurities. FWHM that is a half width of a peak of cristobalite type aluminum phosphate obtained by X-ray diffraction satisfies (i) when X-ray diffraction is performed using a Co-Kα excitation source, a half width (FWHM-Co) of a peak appearing at 2θ=24.8° is 2.5 degree or less, or (ii) when X-ray diffraction is performed using a Cu-Kα excitation source, a half width (FWHM-Cu) of a peak appearing at 2θ=21.3° is 2.1 degree or less.

4 Claims, 1 Drawing Sheet

(51) Int. Cl.

| | |
|---|---|
| ***C21D 6/00*** | (2006.01) |
| ***C21D 8/00*** | (2006.01) |
| ***C21D 8/12*** | (2006.01) |
| ***C22C 38/00*** | (2006.01) |
| ***C22C 38/02*** | (2006.01) |
| ***C22C 38/04*** | (2006.01) |
| ***C22C 38/06*** | (2006.01) |
| ***C22C 38/08*** | (2006.01) |
| ***C22C 38/16*** | (2006.01) |
| ***C22C 38/60*** | (2006.01) |
| ***C23C 8/26*** | (2006.01) |
| ***H01F 1/147*** | (2006.01) |

(52) U.S. Cl.

CPC ............. *C21D 6/008* (2013.01); *C21D 8/005* (2013.01); *C21D 8/1272* (2013.01); *C22C 38/008* (2013.01); *C22C 38/02* (2013.01); *C22C 38/04* (2013.01); *C22C 38/06* (2013.01); *C22C 38/08* (2013.01); *C22C 38/16* (2013.01); *C22C 38/60* (2013.01); *C23C 8/26* (2013.01); *H01F 1/147* (2013.01); *C22C 2202/02* (2013.01)

(56) References Cited

U.S. PATENT DOCUMENTS

| | | | | |
|---|---|---|---|---|
| 6,811,619 | B2 | 11/2004 | Hayakawa et al. | |
| 11,577,291 | B2 * | 2/2023 | Ehashi | C22C 38/04 |
| 2002/0007870 | A1 * | 1/2002 | Ohata | C22C 38/008 148/111 |
| 2003/0180553 | A1 * | 9/2003 | Shigesato | C21D 8/1288 427/127 |
| 2005/0217761 | A1 * | 10/2005 | Ushigami | C21D 8/1283 148/111 |
| 2009/0032142 | A1 | 2/2009 | Kumano et al. | |
| 2011/0212335 | A1 * | 9/2011 | Takeda | C22C 38/02 428/458 |
| 2012/0312423 | A1 | 12/2012 | Murakami et al. | |
| 2013/0292006 | A1 | 11/2013 | Takahashi et al. | |
| 2014/0377573 | A1 | 12/2014 | Okubo et al. | |
| 2015/0007908 | A1 | 1/2015 | Watanabe et al. | |
| 2015/0194247 | A1 | 7/2015 | Shingaki et al. | |
| 2016/0203896 | A1 * | 7/2016 | Nakanishi | C22C 38/002 148/307 |
| 2017/0240988 | A1 * | 8/2017 | Imamura | C22C 38/001 |

FOREIGN PATENT DOCUMENTS

| | | | | |
|---|---|---|---|---|
| JP | 1-147074 | A | 6/1989 | |
| JP | 6-184762 | A | 7/1994 | |
| JP | 7-118750 | A | 5/1995 | |
| JP | 7-278670 | A | 10/1995 | |
| JP | 7-278833 | A | 10/1995 | |
| JP | 11-106827 | A | 4/1999 | |
| JP | 2002-322566 | A | 11/2002 | |
| JP | 2002-348643 | A | 12/2002 | |
| JP | 2002-363763 | A | 12/2002 | |
| JP | 2003-268450 | A | 9/2003 | |
| JP | 2003-293149 | A | 10/2003 | |
| JP | 2003-313644 | A | 11/2003 | |
| JP | 2004-506584 | A | 3/2004 | |
| KR | 10-2011-0083687 | A | 7/2011 | |
| KR | 10-2012-0118504 | A | 10/2012 | |
| RU | 2378393 | C1 | 1/2010 | |
| RU | 2550675 | C1 | 5/2015 | |
| RU | 2580775 | C2 | 4/2016 | |
| RU | 2599942 | C2 | 10/2016 | |
| WO | WO 02/16263 | A1 | 2/2002 | |
| WO | WO-2016067636 | A1 * | 5/2016 | C21D 8/12 |

OTHER PUBLICATIONS

Cullity et al., "New Edition Elements of X-ray Diffraction", Agne Shofu Publishing Inc., (1980), total of 21 pages.

International Search Report for PCT/JP2018/026615 (PCT/ISA/210) mailed on Sep. 25, 2018.

Written Opinion of the International Searching Authority for PCT/JP2018/026615 (PCT/ISA/237) mailed on Sep. 25, 2018.

Christensen et al., "Investigation of the Formation of Cristobalite from the Diatomaceous Clay Moler Using Powder X-ray Diffractometry Data and Profile Refinement Methods," Journal of the American Ceramic Society, vol. 84, No. 4, 2001, pp. 878-880.

* cited by examiner

GRAIN-ORIENTED ELECTRICAL STEEL SHEET

TECHNICAL FIELD OF THE INVENTION

The present invention relates to a grain-oriented electrical steel sheet that is used as an iron core material of a transformer and particularly relates to a grain-oriented electrical steel sheet having excellent adhesion with a tension-insulation coating.

Priority is claimed on Japanese Patent Application No. 2017-137417, filed on Jul. 13, 2017, the content of which is incorporated herein by reference.

RELATED ART

A grain-oriented electrical steel sheet is used mainly in a transformer. A transformer is continuously excited over a long period of time from installation to disuse such that energy loss continuously occurs. Therefore, energy loss occurring when the transformer is magnetized by an alternating current, that is, iron loss is a main index that determines the value of the transformer.

In order to reduce iron loss of a grain-oriented electrical steel sheet, various methods have been developed. Examples of the methods include a method of highly aligning grains in the {110}<001> orientation called Goss orientation in a crystal structure, a method of increasing the content of a solid solution element such as Si that increases electric resistance in a steel sheet, and a method of reducing the thickness of a steel sheet.

In addition, it is known that a method of applying tension to a steel sheet is effective for reducing iron loss. In order to apply tension to a steel sheet, it is effective to form a coating at a high temperature using a material having a lower thermal expansion coefficient than the steel sheet. In a final annealing process, a forsterite film formed in a reaction of an oxide on a steel sheet surface and an annealing separator can apply tension to the steel sheet, and thus also has excellent coating adhesion.

A method disclosed in Patent Document 1 in which an insulation coating is formed by baking a coating solution including colloidal silica and a phosphate as primary components has a high effect of applying tension to a steel sheet and is effective for reducing iron loss. Accordingly, a method of forming an insulating coating including a phosphate as a primary component in a state where a forsterite film formed in a final annealing process remains is a general method of manufacturing a grain-oriented electrical steel sheet.

On the other hand, it has been clarified that a domain wall motion is inhibited by the forsterite film and adversely affects iron loss. In a grain-oriented electrical steel sheet, a magnetic domain changes depending on a domain wall motion in an alternating magnetic field. In order to reduce iron loss, it is effective to smoothly perform the domain wall motion. However, the forsterite film has an uneven structure in a steel sheet/insulation coating interface. Therefore, the smooth domain wall motion is inhibited, which adversely affects iron loss.

Accordingly, a technique of suppressing formation of a forsterite film and smoothing a steel sheet surface has been developed. For example, Patent Documents 2 to 5 disclose a technique of controlling an atmosphere dew point of decarburization annealing and using alumina as an annealing separator so as to smooth a steel sheet surface without forming a forsterite film after final annealing.

This way, when a steel sheet surface is smoothed, as a method of forming a tension-insulation coating having sufficient adhesion, Patent Document 6 discloses a method of forming a tension-insulation coating after forming an amorphous oxide layer on the steel sheet surface. Further, Patent Documents 7 to 11 disclose a technique of controlling a structure of an amorphous oxide layer in order to form a tension-insulation coating having high adhesion.

In a method disclosed in Patent Document 7, coating adhesion with the tension-insulation coating is secured with a structure obtained by performing a pre-treatment on a smoothed steel sheet surface of a grain-oriented electrical steel sheet to introduce fine unevenness thereinto, forming an externally oxidized layer thereon, and forming an externally oxidized granular oxide including silica as a primary component to penetrate the thickness of the externally oxidized layer.

In a method disclosed in Patent Document 8, in a heat treatment process for forming an externally oxidized layer on a smoothed steel sheet surface of a grain-oriented electrical steel sheet, a temperature rising rate in a temperature rising range of 200° C. to 1150° C. is controlled to be 10° C./sec to 500° C./sec such that a cross-sectional area fraction of a metal oxide of iron, aluminum, titanium, manganese, or chromium, or the like in the externally oxidized layer is 50% or less. As a result, coating adhesion with the tension-insulation coating is secured.

In a method disclosed in Patent Document 9, in a process of forming a tension-insulation coating after forming an externally oxidized layer on a smoothed steel sheet surface of a grain-oriented electrical steel sheet, a contact time between the steel sheet with the externally oxidized layer and a coating solution for forming the tension-insulation coating is set to be 20 seconds or shorter such that a proportion of a low density layer in the externally oxidized layer is 30% or less. As a result, coating adhesion with the tension-insulation coating is secured.

In a method disclosed in Patent Document 10, a heat treatment for forming an externally oxidized layer on a smoothed steel sheet surface of a grain-oriented electrical steel sheet is performed at a temperature of 1000° C. or higher, and a cooling rate in a temperature range of a temperature at which the externally oxidized layer is formed to 200° C. is controlled to be 100° C./sec or lower such that a cross-sectional area fraction of voids in the externally oxidized layer is 30% or lower. As a result, coating adhesion with the tension-insulation coating is secured.

In a method disclosed in Patent Document 11, in a heat treatment process for forming an externally oxidized layer on a smoothed steel sheet surface of a grain-oriented electrical steel sheet, a heat treatment is performed under conditions of heat treatment temperature: 600° C. to 1150° C. and atmosphere dew point: −20° C. to 0° C., and cooling is performed at an atmosphere dew point of 5° C. to 60° C. such that a cross-sectional area fraction of metallic iron in the externally oxidized layer is 5% to 30%. As a result, coating adhesion with the tension-insulation coating is secured.

However, it is difficult to sufficiently secure coating adhesion with the tension-insulation coating with the techniques of the related art.

PRIOR ART DOCUMENT

Patent Document

[Patent Document 1] Japanese Unexamined Patent Application, First Publication No. S48-039338

[Patent Document 2] Japanese Unexamined Patent Application, First Publication No. H7-278670

[Patent Document 3] Japanese Unexamined Patent Application, First Publication No. H11-106827
[Patent Document 4] Japanese Unexamined Patent Application, First Publication No. H7-118750
[Patent Document 5] Japanese Unexamined Patent Application, First Publication No. 2003-268450
[Patent Document 6] Japanese Unexamined Patent Application, First Publication No. H7-278833
[Patent Document 7] Japanese Unexamined Patent Application, First Publication No. 2002-322566
[Patent Document 8] Japanese Unexamined Patent Application, First Publication No. 2002-348643
[Patent Document 9] Japanese Unexamined Patent Application, First Publication No. 2003-293149
[Patent Document 10] Japanese Unexamined Patent Application, First Publication No. 2002-363763
[Patent Document 11] Japanese Unexamined Patent Application, First Publication No. 2003-313644

Non-Patent Document

[Non-Patent Document 1] B. D. CULITY, Gentaro Matsumura, "Culity: Elements of X-ray Diffraction (New Edition), Agne Shofu Publishing Inc. (1980)", p. 94

DISCLOSURE OF THE INVENTION

Problems to be Solved by the Invention

The present invention has been made in consideration the current situation of the techniques of the related art, and an object thereof is to improve coating adhesion with a tension-insulation coating in a grain-oriented electrical steel sheet having a smoothed steel sheet surface in which a forsterite film is not formed in an interface between the tension-insulation coating and the steel sheet surface and to provide a grain-oriented electrical steel sheet capable of improving the coating adhesion.

Means for Solving the Problem

The present inventors conducted a thorough investigation on a method for achieving the object. As a result, the present inventors found that coating adhesion with a tension-insulation coating can be evaluated by using, as an index, a half width (FWHM) of a peak of cristobalite type aluminum phosphate at a specific angle in X-ray diffraction (XRD) of the tension-insulation coating, and when the index is in a required range, coating adhesion with the tension-insulation coating can be secured.

The present invention has been made based on the above finding, and the scope thereof is as follows.

(1) According to one aspect of the present invention, there is provided an grain-oriented electrical steel sheet according to the present invention includes: a base steel sheet; an oxide layer that is formed on the base steel sheet and is formed of amorphous $SiO_2$; and a tension-insulation coating that is formed on the oxide layer. The base steel sheet includes, as a chemical composition, by mass %, C: 0.085% or less, Si: 0.80% to 7.00%, Mn: 1.00% or less, acid-soluble Al: 0.065% or less, Seq represented by S+0.406·Se: 0.050% or less, and a remainder consisting of Fe and impurities. FWHM that is a half width of a peak of cristobalite type aluminum phosphate obtained by X-ray diffraction is (i) when X-ray diffraction is performed using a Co-Kα excitation source, FWHM-Co that is a half width of a peak appearing at 2θ=24.8° is 2.5 degree or less, or (ii) when X-ray diffraction is performed using a Cu-Kα excitation source, FWHM-Cu that is a half width of a peak appearing at 2θ=21.3° is 2.1 degree or less.

(2) In the grain-oriented electrical steel sheet according to claim (1), a forsterite film may not be formed.

(3) The base steel sheet may further includes, as a chemical composition, by mass %, at least one selected from the group consisting of N: 0.012% or less, P: 0.50% or less, Ni: 1.00% or less, Sn: 0.30% or less, Sb: 0.30% or less, and Cu: 0.01% to 0.80%.

Effects of the Invention

According to the present invention, it is possible to provide a grain-oriented electrical steel sheet in which a tension-insulation coating having excellent coating adhesion is formed on a steel sheet surface even when a forsterite film is not formed in an interface between the tension-insulation coating and the steel sheet surface.

EMBODIMENTS OF THE INVENTION

Figure 1:
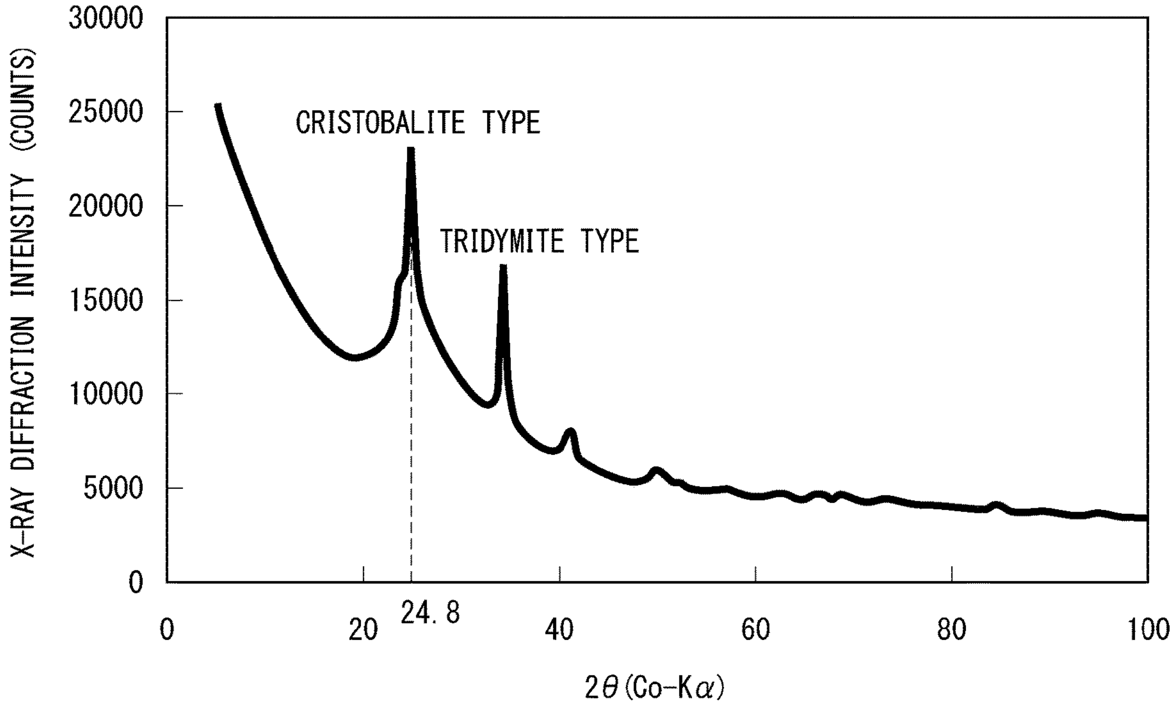
FIG. 1 is a diagram showing an example of X-ray diffraction (XRD) performed using a Co-Kα radiation source.

An grain-oriented electrical steel sheet according to the present invention (also referred to as "electrical steel sheet according to the present invention") includes: a base steel sheet; an oxide layer that is formed on the base steel sheet and is formed of amorphous $SiO_2$; and a tension-insulation coating that is formed on the oxide layer.

The base steel sheet includes, as a chemical composition, by mass %, C: 0.085% or less, Si: 0.80% to 7.00%, Mn: 1.00% or less, acid-soluble Al: 0.065% or less, Seq represented by S+0.406·Se: 0.050% or less, and a remainder consisting of Fe and impurities.

FWHM that is a half width of a peak of cristobalite type aluminum phosphate obtained by X-ray diffraction satisfies (i) when X-ray diffraction is performed using a Co-Kα excitation source, FWHM-Co that is a half width of a peak appearing at 2θ=24.8° is 2.5 degree or less, or (ii) when X-ray diffraction is performed using a Cu-Kα excitation source, FWHM-Cu that is a half width of a peak appearing at 2θ=21.3° is 2.1 degree or less.

Hereinafter, the electrical steel sheet according to the present invention will be described in detail.

The present inventors thought that coating adhesion with a tension-insulation coating in a grain-oriented electrical steel sheet not including a forsterite film is not necessarily sufficient due to a difference in the amount of moisture produced along with decomposition of aluminum phosphate included in the tension-insulation coating.

That is, the present inventors thought that a structure of an amorphous oxide layer formed in an interface between the tension-insulation coating and the steel sheet surface varies due to a difference in the amount of moisture produced along with decomposition of aluminum phosphate such that the coating adhesion with the tension-insulation coating varies.

The present inventors presumed as follows. As the decomposition of aluminum phosphate progresses sufficiently, the amount of moisture produced increases, an amorphous oxide layer is sufficiently formed, and coating adhesion with the tension-insulation coating is improved. On the other hand, crystallization of aluminum phosphate progresses along with the decomposition of aluminum phosphate.

Therefore, the present inventors investigated a relationship between the X-ray diffraction result and coating adhesion while changing baking conditions (oxygen partial pressure) in a process of baking the tension-insulation coating.

An annealing separator including alumina as a primary component was applied to a decarburization annealed sheet as a test material having a thickness of 0.23 mm, and final annealing was performed thereon for secondary recrystallization. As a result, a grain-oriented electrical steel sheet not including a forsterite film was prepared.

A coating solution including aluminum phosphate, chromic acid, and colloidal silica as primary components was applied to the grain-oriented electrical steel sheet and was baked in an atmosphere having an oxygen partial pressure ($PH_2O/PH_2$) of 0.008 to 0.500 under conditions of soaking temperature: 870° C. and soaking time: 60 seconds. As a result, the grain-oriented electrical steel sheet including the tension-insulation coating was prepared.

X-ray diffraction (XRD) was performed on the surface of the grain-oriented electrical steel sheet using a Co-Kα radiation source.

FIG. 1 is a diagram showing an example of X-ray diffraction (XRD) performed using a Co-Kα radiation source. The present inventors focused on a peak of cristobalite type aluminum phosphate appearing at 2θ=24.8° in an X-ray diffraction (XRD) pattern and obtained a half width (FWHM) of the peak. Another main peak in the X-ray diffraction (XRD) pattern of aluminum phosphate is a tridymite peak appearing at 2θ=34.3°. When X-ray diffraction (XRD) is performed using a Cu-Kα radiation source under a condition of slit width: 1.0 mm, a peak of cristobalite type aluminum phosphate appears at 2θ=21.3°.

Next, the present inventors investigated a relationship between a half width (FWHM) of a peak of cristobalite type aluminum phosphate appearing at 2θ=24.8° in X-ray diffraction (XRD) of the prepared grain-oriented electrical steel sheet and coating adhesion with the tension-insulation coating.

Coating adhesion was evaluated based on an area fraction of a portion of the coating (hereinafter, also referred to as "area fraction of remained coating") that remained without being peeled off from the steel sheet when the test piece was wound by 180° around a cylinder having a diameter of 20 mm.

Figure 2:
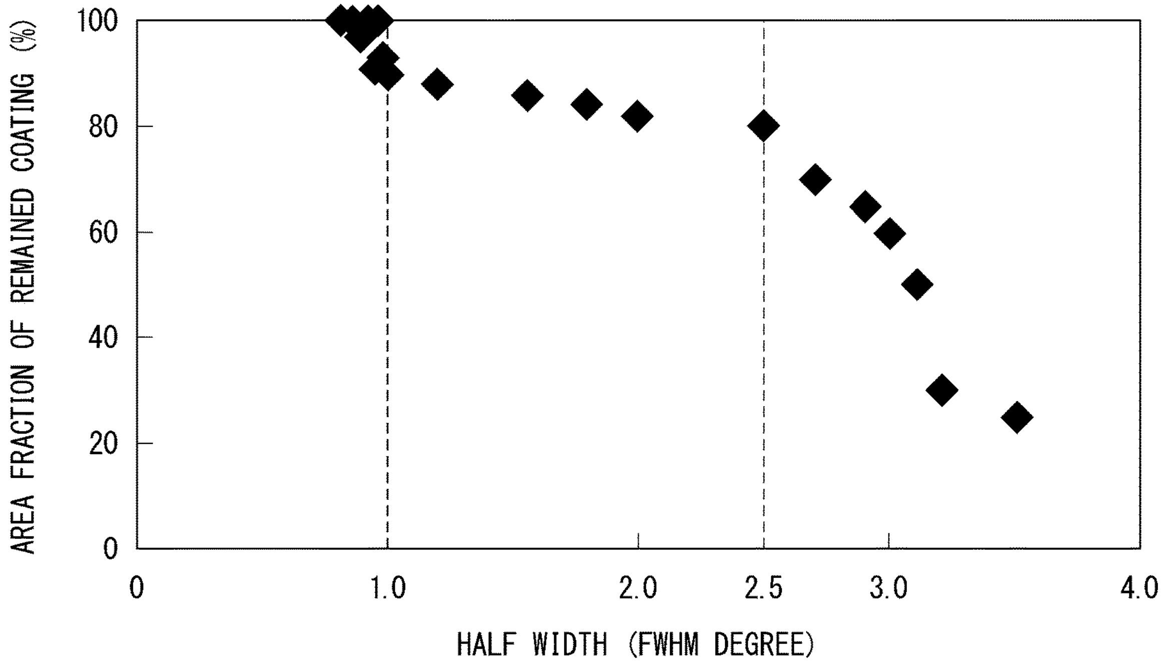
FIG. 2 is a diagram showing a relationship between a half width of an X-ray diffraction (XRD) peak and an area fraction of remained coating of a tension-insulation coating.

FIG. 2 is a diagram showing a relationship between the half width of the X-ray diffraction (XRD) peak and the area fraction of remained coating of the tension-insulation coating. It can be seen from FIG. 2 that, when the half width (FWHM) of the peak of the cristobalite type aluminum phosphate of the grain-oriented electrical steel sheet appearing at 2θ=24.8° is 2.5 or less, the area fraction of remained coating is 80% or more. Further, it can be seen that, when the half width (FWHM) is 1.0 or less, the area fraction of remained coating is 90% or more.

Based on this result, the electrical steel sheet according to the present invention was regulated such that the half width (FWHM-Co) appearing at 2θ=24.8° in X-ray diffraction using a Co-Kα excitation source is 2.5 degree or less (Requirement (i)). This point is a characteristic of the electrical steel sheet according to the present invention.

In addition, in the same investigation, the present inventors found that, in a case where X-ray diffraction (XRD) is performed using a Cu-Kα radiation source under a condition of slit width: 1.0 mm, when the half width (FWHM-Cu) of the peak of cristobalite type aluminum phosphate appearing at 2θ=21.3° is 2.1 (degree) or less, the area fraction of remained coating of the tension-insulation coating is 80% or more.

In the X-ray diffraction, an X-ray diffractometer (Smart Lab. Rigaku Corporation) was used. As a measurement method, grazing-incidence X-ray diffraction was used.

Based on this result, the electrical steel sheet according to the present invention was regulated such that the half width (FWHM-Cu) appearing at 2θ=21.3° in X-ray diffraction using a Cu-Kα excitation source is 2.1 degree or less (Requirement (ii)). This point is also a characteristic of the electrical steel sheet according to the present invention.

The characteristics of the electrical steel sheet according to the present invention are based on the X-ray diffraction characteristics of the tension-insulation coating. Therefore, in the electrical steel sheet according to the present invention, irrespective of whether or not a forsterite film is formed in an interface between the tension-insulation coating and the steel sheet surface, the coating adhesion with the tension-insulation coating can be sufficiently secured due to the above-described characteristics.

Further, the present inventors focused on the Scherrer equation of the following Formula (1) described in Non-Patent Document 1.

$$\text{Crystallite Size (Å)} = K \times \lambda / (\beta \times \cos\theta) \quad (1)$$

In the Scherrer equation defining the crystallite size, K represents a Scherrer constant (0.9), λ represents an X-ray wavelength (Λ), β represents a half width of an XRD peak at a diffraction angle 2θ, and θ represents a diffraction angle. In X-ray diffraction (XRD) using a Co-Kα radiation source, A is 1.7889.

The half width of a test piece having excellent coating adhesion was less than that of a test piece having poor coating adhesion. This indicates that, the crystallite size of the test piece having excellent coating adhesion is larger than that of the test piece having poor coating adhesion as estimated from the Scherrer equation, that is, crystallization progresses in the tension-insulation coating.

[Base Steel Sheet]

Next, a component composition of the base steel sheet will be described. Hereinafter, "%" represents "mass %".

C: 0.085% or Less

C is an element that significantly increases iron loss during magnetic aging. When the C content is more than 0.085%, an increase in iron loss is significant. Therefore, the C content is set to be 0.085% or less. The C content is preferably 0.010% or less and more preferably 0.005% or less. It is preferable that the C content is as less as possible from the viewpoint of reducing iron loss. Therefore, the lower limit is not particularly limited. However, since the detection limit is about 0.0001%, 0.0001% is the substantial lower limit of the C content.

Si: 0.80% to 7.00%

Si is an element that controls secondary recrystallization during secondary recrystallization annealing and contributes to improvement of magnetic characteristics. When the Si content is less than 0.80%, phase transformation of the steel sheet occurs during secondary recrystallization annealing, it is difficult to control secondary recrystallization, and high magnetic flux density and iron loss characteristics cannot be obtained. Therefore, the Si content is 0.80% or more. The Si content is preferably 2.50% or more and more preferably 3.00% or more.

On the other hand, when the Si content is more than 7.00%, the steel sheet becomes brittle, and passability significantly deteriorates in a manufacturing process. Therefore, the Si content is 7.00% or less. The Si content is preferably 4.00% or less and more preferably 3.75% or less.

Mn: 1.00% or Less

Mn is an austenite-forming element and is also an element that controls secondary recrystallization during secondary recrystallization annealing and contributes to improvement of magnetic characteristics. When the Mn content is less than 0.01%, the steel sheet becomes brittle during hot rolling. Therefore, the Mn content is preferably 0.01% or more. The Mn content is preferably 0.05% or more and more preferably 0.10% or more.

On the other hand, when the Mn content is more than 1.00%, phase transformation of the steel sheet occurs during secondary recrystallization annealing, and high magnetic flux density and iron loss characteristics cannot be obtained. Therefore, the Mn content is 1.00% or less. The Mn content is preferably 0.70% or less and more preferably 0.50%.

Acid-Soluble Al: 0.065% or Less

The acid-soluble Al is an element that binds to N to form (Al,Si)N functioning as an inhibitor. When the acid-soluble Al content is less than 0.010%, the amount of AlN formed decreases, and secondary recrystallization may progress insufficiently. Therefore, the acid-soluble Al content is preferably 0.010% or more. The acid-soluble Al content is preferably 0.015% or more and more preferably 0.020% or more.

On the other hand, when the acid-soluble Al content is more than 0.065%, precipitation dispersion of AlN becomes non-uniform, a desired secondary recrystallization structure cannot be obtained, the magnetic flux density decreases, and the steel sheet becomes brittle. Therefore, the acid-soluble Al content is 0.065% or less. The acid-soluble Al content is preferably 0.060% or less and more preferably 0.050% or less.

Seq (=S+0.406·Se): 0.050% or Less

S and/or Se is an element that binds to Mn to form MnS and/or MnSe functioning as an inhibitor. The addition amount is defined by Seq=S+0.406·Se in consideration of an atomic weight ratio between S and Se.

When the Seq content is less than 0.003%, the addition effect may be insufficiently exhibited. Therefore, the Seq content is preferably 0.003% or more. The Seq content is preferably 0.005% or more and more preferably 0.007% or more.

On the other hand, when the Seq content is more than 0.050%, precipitation dispersion of MnS and/or MnSe becomes non-uniform, a desired secondary recrystallization structure cannot be obtained, and the magnetic flux density decreases. Therefore, the Seq content is 0.050% or less. The Seq content is preferably 0.035% or less and more preferably 0.015% or less.

The remainder in the base steel sheet other than the above-described elements consists of Fe and impurities (unavoidable impurities). The impurities (unavoidable impurities) are elements that are unavoidably incorporated from steel raw materials and/or in the steelmaking process.

Within a range where the characteristic of the electrical steel sheet according to the present invention do not deteriorate, the base steel sheet may include at least one selected from the group consisting of N: 0.012% or less, P: 0.50% or less, Ni: 1.00% or less, Sn: 0.30% or less, Sb: 0.30% or less, and Cu: 0.01% to 0.80%.

N: 0.012% or Less

N is an element that binds to Al to form AlN functioning as an inhibitor and is also an element that forms blisters (voids) in the steel sheet during cold rolling. When the N content is less than 0.001%, formation of AlN is not sufficient. Therefore, the N content is preferably 0.001% or more. The N content is more preferably 0.006% or more.

On the other hand, when the N content is more than 0.012%, blisters (voids) may be formed in the steel sheet during cold rolling. Therefore, the N content is preferably 0.012% or less. The N content is more preferably 0.010% or less.

P: 0.50% or Less

P is an element that increases the specific resistance of the steel sheet to contribute to a decrease in iron loss. When the P content is more than 0.50%, rollability deteriorates. Therefore, the P content is 0.50% or less. The P content is more preferably 0.35% or less. The lower limit may be 0%, but from the viewpoint of reliably obtaining the addition effect, the P content is preferably 0.02% or more.

Ni: 1.00% or Less

Ni is an element that increases the specific resistance of the steel sheet to contribute to a decrease in iron loss and controls the metallographic structure of the hot-rolled steel sheet to contribute to improvement of magnetic characteristics. When the Ni content is more than 1.00%, secondary recrystallization progresses unstably. Therefore, the Ni content is preferably 1.00% or less. The Ni content is more preferably 0.75% or less. The lower limit may be 0%, but from the viewpoint of reliably obtaining the addition effect, the P content is preferably 0.02% or more.

Sn: 0.30% or Less

Sb: 0.30% or Less.

Sn and Sb are elements that segregate in a grain boundary and function to prevent Al from being oxidized by water emitted from the annealing separator during final annealing (due to this oxidation, the inhibitor intensity varies depending on coil positions, and magnetic characteristics vary).

When the content of any of the elements is more than 0.30%, secondary recrystallization becomes unstable, and magnetic characteristics deteriorate. Therefore, the content of any of Sn and Sb is preferably 0.30% or less. The content of any of the elements is more preferably 0.25% or less. The lower limit may be 0%, but from the viewpoint of reliably obtaining the addition effect, the amount of any of the elements is preferably 0.02% or more.

Cu: 0.01% to 0.80%

Cu is an element that binds to S and/or Se to form a precipitate functioning as an inhibitor. When the Cu content is less than 0.01%, the addition effect is not sufficiently exhibited. Therefore, the Cu content is preferably 0.01% or more. The Cu content is more preferably 0.04% or more.

On the other hand, when the Cu content is more than 0.80%, dispersion of precipitates becomes non-uniform, and the effect of reducing iron loss is saturated. Therefore, the Cu content is preferably 0.80% or less. The Cu content is more preferably 0.60% or less.

[Oxide Layer]

The grain-oriented electrical steel sheet according to the embodiment includes an oxide layer that is formed on the base steel sheet and is formed of amorphous $SiO_2$.

The oxide layer has a function of adhesion between the base steel sheet and the tension-insulation coating.

The formation of the oxide layer on the base steel sheet can be checked by processing a cross-section of the steel sheet by focused ion beam (FIB) and observing a 10 μm×10 μm range with a transmission electron microscope (TEM).

[Tension-Insulation Coating]

The tension-insulation coating is a glass insulation coating that is formed on the oxide layer and is formed by applying a solution including a phosphate and colloidal silica ($SiO_2$) as primary components and baking the solution.

This tension-insulation coating can apply high surface tension to the base steel sheet.

Next, a method for manufacturing the electrical steel sheet according to the present invention will be described.

Molten steel having a required component composition is cast using a typical method to obtain a slab (raw material). The slab is provided for typical hot rolling to obtain a hot-rolled steel sheet. Next, hot-band annealing is performed on the hot-rolled steel sheet. Next, cold rolling is performed once or cold rolling is performed multiple times while performing intermediate annealing therebetween. As a result, a steel sheet having the same thickness as that of a final product is obtained. Next, decarburization annealing is performed on the steel sheet.

During decarburization annealing, a heat treatment is performed in humidified hydrogen such that the C content in the steel sheet is reduced up to the content where magnetic characteristics do not deteriorate due to magnetic aging in the steel sheet as a product. In addition, the metallographic structure is primarily recrystallized by decarburization annealing to prepare secondary recrystallization. Further, the steel sheet is annealed in an ammonia atmosphere to form AlN as an inhibitor. Next, final annealing is performed at a temperature of 1100° C. or higher.

Final annealing may be performed on the steel sheet coiled in the form of a coil after applying an annealing separator including $Al_2O_3$ as a primary component to the steel sheet surface in order to prevent seizure of the steel sheet. After final annealing, a redundant annealing separator is removed by cleaning with water (post-treatment process). Next, the steel sheet is annealed in a mixed atmosphere of hydrogen and nitrogen to form an amorphous oxide layer.

In the post-treatment process after final annealing, a redundant annealing separator is removed by cleaning with water using a scrubber brush. In the post-treatment process after final annealing according to the embodiment, the rotation speed of the scrubber brush is 500 to 1500 rpm. As a result, the area of a metal active surface increases, and the elution amount of Fe ions during thermal oxidation annealing or coating baking increases. As a result, formation of iron phosphate is promoted, and the crystallinity of aluminum phosphate changes. The rotation speed of the scrubber brush is more preferably 800 to 1400 rpm and still more preferably 1000 to 1300 rpm.

An oxygen partial pressure in the mixed atmosphere for forming the amorphous oxide layer is preferably 0.005 or lower and more preferably 0.001 or lower. In addition, a retention temperature is preferably 600° C. to 1150° C. and more preferably 700° C. to 900° C.

In order to control the crystallite size of cristobalite type aluminum phosphate, conditions in the baking process after applying the coating solution for forming the tension-insulation coating to the steel sheet surface are important. That is, in order to make the crystallization of aluminum phosphate progress, in addition to the rotation speed of the scrubber brush in the post-treatment process after final annealing, it is also important to set the oxygen partial pressure in the baking process to be low.

The oxygen partial pressure in the baking process is preferably 0.008 to 0.200. When the oxygen partial pressure is lower than 0.008, the decomposition of aluminum phosphate becomes excessive, coating defect occurs, and the coating reacts with iron to be blackened. Therefore, the oxygen partial pressure is preferably 0.008 or higher. The oxygen partial pressure is more preferably 0.015 or higher.

On the other hand, when the oxygen partial pressure is higher than 0.200, the crystallization of aluminum phosphate does not progress. Therefore, the oxygen partial pressure is preferably 0.200 or lower. The oxygen partial pressure is preferably 0.100 or lower.

In the baking process, baking is performed at a retention temperature of 800° C. to 900° C. for a baking time of 30 to 100 seconds.

When the retention temperature is lower than 800° C. the crystallization of aluminum phosphate does not sufficiently progress. Therefore, the retention temperature is preferably 800° C. or higher. The retention temperature is more preferably 835° C. or higher. When the retention temperature is higher than 900° C., the decomposition of aluminum phosphate becomes excessive, coating defect occurs, and the coating reacts with iron to be blackened. Therefore, the retention temperature is preferably 900° C. or lower. The retention temperature is more preferably 870° C. or lower.

It is not preferable that the baking time is shorter than 30 seconds because the crystallization of aluminum phosphate does not sufficiently progress. It is not preferable that the baking time is longer than 100 seconds because the decomposition of aluminum phosphate becomes excessive, coating defect occurs, and the coating reacts with iron to be blackened.

As a result, after applying the coating solution for forming the tension-insulation coating, a grain-oriented electrical steel sheet having excellent coating adhesion can be obtained.

EXAMPLES

Next, examples of the present invention will be described. However, conditions of the examples are merely exemplary to confirm the operability and the effects of the present invention, and the present invention is not limited to these condition examples. The present invention can adopt various conditions within a range not departing from the scope of the present invention as long as the object of the present invention can be achieved under the conditions.

Examples

Each of slabs (silicon steel) having component compositions shown in Table 1-1 was heated to 1100° C. and was hot-rolled to form a hot-rolled steel sheet having a thickness of 2.6 mm. After annealing the hot-rolled steel sheet at 1100° C., cold rolling was performed once or cold rolling was performed multiple times while performing intermediate annealing therebetween. As a result, a cold-rolled steel sheet having a final thickness of 0.23 mm was formed.

TABLE 1-1

| | Component Composition (mass %) | | | | | |
|---|---|---|---|---|---|---|
| Stel No. | C | Si | Mn | Acid-Soluble Al | S | Others |
| A1 | 0.007 | 3.00 | 0.01 | 0.015 | 0.005 | N: 0.006 |
| A2 | 0.010 | 3.73 | 1.01 | 0.020 | 0.009 | N: 0.008, Cu: 0.46 |
| A3 | 0.003 | 2.50 | 0.51 | 0.031 | 0.002 | Ni: 0.70 |
| A4 | 0.003 | 3.79 | 1.40 | 0.026 | 0.004 | Sn: 0.21 |
| A5 | 0.073 | 6.50 | 0.20 | 0.050 | 0.0008 | Sb: 0.15, Cu: 0.58 |
| A6 | 0.008 | 4.00 | 0.80 | 0.064 | 0.0007 | |
| A7 | 0.072 | 3.23 | 0.78 | 0.082 | 0.03 | |
| A8 | 0.081 | 3.75 | 0.61 | 0.089 | 0.04 | |
| A9 | 0.065 | 3.24 | 0.09 | 0.069 | 0.009 | |
| A10 | 0.073 | 3.55 | 0.31 | 0.092 | 0.012 | |

After performing decarburization annealing and nitriding annealing on the cold-rolled steel sheet, a water slurry of an annealing separator including alumina as a primary component was applied to the steel sheet surface. Next, final annealing was performed at 1200° C. for 20 hours. After final annealing, a redundant annealing separator was removed by cleaning with water using a scrubber brush. The rotation speed of the scrubber brush is shown in Table 2.

As a result, a grain-oriented electrical steel sheet having specular glossiness not including a forsterite film on which secondary recrystallization was performed was obtained. The chemical composition of the base steel sheet is shown in Table 1-2.

TABLE 1-2

| | Component Composition (mass %) | | | | | |
|---|---|---|---|---|---|---|
| Stel No. | C | Si | Mn | Acid-Soluble Al | S | Others |
| A1 | 0.085 | 0.80 | 0.00 | 0.000 | 0 | N: 0.01 |
| A2 | 0.062 | 1.40 | 0.02 | 0.010 | 0.009 | N: 0.008, Cu: 0.04 |
| A3 | 0.058 | 2.50 | 0.03 | 0.018 | 0.013 | Ni: 0.08 |
| A4 | 0.052 | 3.10 | 0.04 | 0.024 | 0.018 | Sn: 0.2 |
| A5 | 0.044 | 3.45 | 0.05 | 0.029 | 0.021 | Sb: 0.2, Cu: 0.05 |

TABLE 1-2-continued

| | Component Composition (mass %) | | | | | |
|---|---|---|---|---|---|---|
| Stel No. | C | Si | Mn | Acid-Soluble Al | S | Others |
| A6 | 0.038 | 4.10 | 0.06 | 0.038 | 0.029 | |
| A7 | 0.032 | 4.50 | 0.07 | 0.048 | 0.032 | |
| A8 | 0.029 | 5.20 | 0.08 | 0.054 | 0.038 | |
| A9 | 0.014 | 6.40 | 0.09 | 0.061 | 0.048 | |
| A10 | 0.008 | 7.00 | 1.00 | 0.065 | 0.05 | |

Soaking was performed on the grain-oriented electrical steel sheet at 800° C. for 30 seconds in an atmosphere including 25% of nitrogen and 75% of hydrogen and having an oxygen partial pressure of 0.0005. Next, through a heat treatment of performing cooling to room temperature in an atmosphere including 25% of nitrogen and 75% of hydrogen and having an oxygen partial pressure of 0.0005, an amorphous oxide layer was formed on the steel sheet surface.

A coating solution for forming a tension-insulation coating including aluminum phosphate and colloidal silica was applied to the grain-oriented electrical steel sheet with the amorphous oxide layer, and soaking was performed under conditions of a baking temperature and a baking temperature shown in Table 2 in an atmosphere including 25% of nitrogen and 75% of hydrogen and having an oxygen partial pressure shown in Table 2. As a result, a grain-oriented electrical steel sheet was obtained. The coating adhesion of the grain-oriented electrical steel sheet obtained as described above was evaluated. The results are shown in Table 3.

In Examples B8 to B10, a forsterite film was formed. A forming method is as follows.

After performing decarburization annealing and nitriding annealing on the cold-rolled steel sheet, a water slurry of an annealing separator including MgO as a primary component was applied to the steel sheet surface. Next, final annealing was performed at 1200° C. for 20 hours.

TABLE 2

| | | | | Baking Process of Tension-Insulation Coating | | |
|---|---|---|---|---|---|---|
| | No | Steel No. | Rotation Speed (rpm) of Scrubber Brush | Oxygen Partial Pressure | Retention Temperature (° C.) | Baking Time (sec) |
| Example | B1 | A1 | 1000 | 0.001 | 850 | 60 |
| | B2 | A2 | 1200 | 0.001 | 850 | 60 |
| | B3 | A3 | 1300 | 0.001 | 850 | 60 |
| | B4 | A4 | 1200 | 0.030 | 850 | 60 |
| | B5 | A5 | 1200 | 0.050 | 850 | 60 |
| | B6 | A6 | 800 | 0.001 | 850 | 60 |
| | B7 | A7 | 1400 | 0.001 | 850 | 60 |
| | B8 | A8 | 1200 | 0.001 | 850 | 60 |
| | B9 | A9 | 900 | 0.001 | 850 | 60 |
| | B10 | A10 | 1200 | 0.003 | 850 | 60 |
| Comparative Example | b1 | A3 | 1000 | 0.050 | 950 | 60 |
| | b2 | A4 | 400 | 0.050 | 850 | 60 |
| | b3 | A3 | 2000 | 0.050 | 850 | 60 |
| | b4 | A4 | 1000 | 0.005 | 850 | 60 |
| | b5 | A3 | 1000 | 0.210 | 850 | 60 |

TABLE 3

| | | Half Width of Cristobalite type Aluminum Phosphate | | | |
|---|---|---|---|---|---|
| | No | FWHM-Co (degree) | FWHM-Cu (degree) | Forsterite Film | Coating Adhesion |
| Example | B1 | 0.8 | | — | Good |
| | B2 | | 0.9 | — | Good |
| | B3 | 1.0 | | — | Good |
| | B4 | | 1.1 | — | Fair |

TABLE 3-continued

| | No | Half Width of Cristobalite type Aluminum Phosphate FWHM-Co (degree) | FWHM-Cu (degree) | Forsterite Film | Coating Adhesion |
|---|---|---|---|---|---|
| | B5 | 1.8 | | — | Fair |
| | B6 | | 1.5 | — | Fair |
| | B7 | 2.5 | 1.6 | — | Fair |
| | B8 | 0.9 | 1.8 | Formed | Good |
| | B9 | | 1.9 | Formed | Fair |
| | B10 | 1.3 | 2.1 | Formed | Fair |
| Comparative Example | b1 | 4.0 | | — | Poor |
| | b2 | | 2.8 | — | Poor |
| | b3 | 3.2 | | — | Poor |
| | b4 | | 2.2 | — | Poor |
| | b5 | 3.1 | | — | Poor |

In order to evaluate crystallinity, grazing-incidence X-ray diffraction using a Co-Kα radiation source was performed under conditions of incident angle: 0.5° constant and slit width: 1.0 mm. After performing X-ray diffraction, a half width of cristobalite type aluminum phosphate appearing at 2θ=24.8° was obtained.

In addition, in order to evaluate crystallinity, grazing-incidence X-ray diffraction using a Cu-Kα radiation source was performed under conditions of incident angle: 0.5° constant and slit width: 1.0 mm. After performing X-ray diffraction, a half width of cristobalite type aluminum phosphate appearing at 2θ=21.3° was obtained.

In the X-ray diffraction, an X-ray diffractometer (Smart Lab, Rigaku Corporation) was used. As a measurement method, grazing-incidence X-ray diffraction was used.

Next, a test piece was wound around a cylinder having a diameter of 20 mm and was bent by 180°. At this time, an area fraction of remained coating was obtained, and coating adhesion with the tension-insulation coating was evaluated based on the area fraction of remained coating. Regarding the coating adhesion of the tension-insulation coating, a case where the tension-insulation coating was not peeled off from the steel sheet and the area fraction of remained coating was 90% or higher was evaluated as "GOOD", and a case where the area fraction of remained coating was 80% or higher and lower than 90% was evaluated as "Fair", and a case where the area fraction of remained coating was lower than 80% was evaluated as "Poor". A evaluation result of "Good" or "Fair" was set as "Pass".

It can be seen from Table 3 that, in Examples, all the evaluation results of coating adhesion were "Pass" and the coating adhesion of the tension-insulation coating was excellent. On the other hand, in Comparative Examples, all the evaluation results of coating adhesion were "Fail".

When the formation of the oxide layer was checked by processing a cross-section of each of the cross-sections according to Examples and Comparative Examples in Table 3 by focused ion beam (FIB) and observing a 10 μm×10 μm range with a transmission electron microscope (TEM), the oxide layer was formed in all Examples and Comparative Examples.

INDUSTRIAL APPLICABILITY

As described above, according to the present invention, it is possible to provide a grain-oriented electrical steel sheet in which a tension-insulation coating having excellent coating adhesion is formed on a steel sheet surface even when a forsterite film is not formed in an interface between the tension-insulation coating and the steel sheet surface. Accordingly, the present invention is highly applicable to the industries of manufacturing and using electrical steel sheets.

The invention claimed is:

1. A grain-oriented electrical steel sheet comprising:

a base steel sheet;

an oxide layer that is formed on the base steel sheet and is formed of amorphous $SiO_2$; and a tension-insulation coating that is formed on the oxide layer, wherein the base steel sheet includes, as a chemical composition, by mass %, C: 0.014% or less, Si: 0.80% to 7.00%, Mn: 1.00% or less, acid-soluble Al: 0.065% or less, Seq represented by S+0.406·Se: 0.050% or less, N: 0.006% to 0.012%, and a remainder comprising Fe and impurities, FWHM that is a half width of a peak of cristobalite type aluminum phosphate obtained by X-ray diffraction is (i) when X-ray diffraction is performed using a Co-Kα excitation source, FWHM-Co that is a half width of a peak appearing at 2θ=24.8° is 2.5 degree or less, or (ii) when X-ray diffraction is performed using a Cu-Kα excitation source, FWHM-Cu that is a half width of a peak appearing at 2θ=21.3° is 2.1 degree or less.

2. The grain-oriented electrical steel sheet according to claim 1, wherein a forsterite film is not formed.

3. The grain-oriented electrical steel sheet according to claim 1, wherein the base steel sheet further includes, as a chemical composition, by mass %, at least one of P: 0.50% or less, Ni: 0.02% or more and 1.00% or less, Sn: 0.30% or less, Sb: 0.30% or less, and Cu: 0.01% to 0.80%.

4. The grain-oriented electrical steel sheet according to claim 2, wherein the base steel sheet further includes, as a chemical composition, by mass %, at least one of P: 0.50% or less, Ni: 0.02% or more and 1.00% or less, Sn: 0.30% or less, Sb: 0.30% or less, and Cu: 0.01% to 0.80%.

* * * * *